United States Patent [19]

England et al.

[11] Patent Number: 5,042,528

[45] Date of Patent: Aug. 27, 1991

[54] GAS SERVICE TEE

[76] Inventors: Frank R. England, 4819 Old Mooringsport Rd.; Robert E. Davis, 4281 Linda La., both of Shreveport, La. 71107

[21] Appl. No.: 548,865

[22] Filed: Jul. 6, 1990

[51] Int. Cl.[5] .............................................. F16K 11/14

[52] U.S. Cl. ....................................... 137/605; 73/201

[58] Field of Search ...................... 137/15, 315, 599.1, 137/606, 605; 73/198, 201

[56] References Cited

U.S. PATENT DOCUMENTS

| | | | |
|---|---|---|---|
| 3,148,690 | 9/1964 | Petersen | 73/201 X |
| 3,245,257 | 4/1966 | Anderson | 73/201 |
| 3,256,735 | 6/1966 | Smith | 137/599.1 X |
| 3,272,009 | 9/1966 | Leopold et al. | 137/599.1 X |
| 3,296,861 | 1/1967 | Mueller et al. | 137/599.1 X |
| 3,444,724 | 5/1969 | Gilpin | 73/201 X |
| 3,799,182 | 3/1974 | Long | 137/15 |
| 4,127,141 | 11/1978 | Ledonne et al. | 137/15 |
| 4,411,459 | 10/1983 | Ver Nooy | 137/15 X |
| 4,869,281 | 9/1989 | Rockower et al. | 137/15 |
| 4,911,193 | 3/1990 | Smith | 137/15 |

*Primary Examiner*—Stephen M. Hepperle
*Attorney, Agent, or Firm*—John M. Harrison

[57] ABSTRACT

A gas service tee designed to facilitate tamper-proof termination of gas service to a residential or business location and/or removal of the gas meter without interruption of gas service. The gas service tee is characterized in a first preferred embodiment by a tee fitting located in the gas service line downstream from the gas meter and an adaptor having a tamper-proof adaptor stem mounted in the tee fitting, which adaptor stem can be adjusted to stop the flow of gas through the line. In a second preferred embodiment of the invention the adaptor stem is hollow and is provided with spaced stem openings and a stem grip may be provided for threadably rotating the stem inside an adaptor fitting located in the tee fitting. A tube fitting may also be provided on the stem or stem grip for receiving the hose of an auxiliary gas supply bottle and supplying gas to the residential or business location while the gas meter is being repaired or replaced.

9 Claims, 1 Drawing Sheet

GAS SERVICE TEE

BACKGROUND OF THE INVENTION

Field of the Invention

This invention relates to gas meter servicing of residential and commercial property and more particularly, to a gas service tee for selectively interrupting gas service in a tamper-proof manner and facilitating removal of the gas meter without the necessity of disrupting service to the property. In a first preferred embodiment the gas service tee is characterized by a tee fitting mounted in a gas service line downstream from the gas meter and provided with an adaptor having a threaded stem fitted with a tamper-proof drive seat and seal and installed in the tee fitting, such that manipulation of the normally-open adaptor stem operates to seal the gas service line and prevent the flow of gas through the line. In a second preferred embodiment of the invention the threaded stem component of the gas service tee is perforated and hollow and is fitted with an optional stem grip and a threaded nipple for receiving a corresponding hose fitting connected to a gas supply hose extending from a gas cylinder. Auxiliary gas may be thusly introduced into the gas service line when the line is closed, to facilitate a continuing supply of gas to the residence or commercial property while the gas meter is being repaired or replaced. Alternatively, a hose connector may be used to connect the hollow stem to a gas cylinder hose in order to supply auxiliary gas to the gas service tee and gas service line under circumstances where the stem is not fitted with a stem grip or threaded nipple.

One of the problems which is encountered in the gas supply business is that of terminating customer service for nonpayment of gas bills in a manner which prevents unauthorized tampering of a gas meter and fittings. Another problem is the replacement of gas meters without disrupting service to the customer, whether the service is provided at a residential or commercial property. Gas meters are typically temporarily disconnected from service by closing the service line valve and placing a padlock on the valve to prevent unauthorized reopening of the valve. Another problem is that of repairing or replacing gas meters without disrupting service to customers, since the gas must flow through the meter to reach the residence or commercial property. Gas meters are typically maintained or replaced by initially closing the service line valve, thereby disrupting service and subsequently replacing the gas meter, after which the service must be restored by relighting pilot lights, a procedure which is both costly and time-consuming.

Description of the Prior Art

Various patents of interest are as follows: U.S. Pat. No. 3,799,182, entitled "Add-On Stopper Valve For Existing Piping"; U.S. Pat. No. 4,127,141, entitled "Method and Apparatus for Stopping Fluid Escape From Pipe Mains"; U.S. Pat. No. 4,411,459, entitled "Branch Fitting For Providing Access to the Interior of a Pipe"; U.S. Pat. No. 4,869,281, entitled "Service Line Access System"; and U.S. Pat. No. 4,911,193, entitled "Temporary Or Permanent Blocking of the Bore of a Pipe".

It is an object of this invention to provide a gas service tee which is capable of terminating gas service to a residential or commercial customer without the requirement of using a padlock or other technique for securing the gas service valve.

Another object of this invention is to provide a gas service tee which is capable of introducing gas into the gas supply line downstream of the gas meter while the gas meter is being replaced, without terminating the gas supply service.

A still further object of this invention is to provide a gas service tee which is mounted in the service line of a gas meter service system downstream of the gas meter, which gas service tee is designed both for selectively interrupting gas service to residential or commercial property in a tamper-proof manner without the necessity of using a padlock and introducing auxiliary gas into the service line while the gas meter is being repaired or replaced, without interrupting gas service.

A still further object of this invention is to provide a gas service tee which is characterized by a tee fitting mounted in the gas service line downstream from the gas meter and an adaptor threaded in the tee fitting and having a drive seat and a seal for closing the gas meter service line in a tamper-proof fashion to selectively interrupt gas service.

Another object of this invention is to provide a gas service tee which is characterized by a tee fitting located in a gas service line downstream from the gas meter, which tee fitting is provided with an adaptor having a hollow, perforated adaptor stem with a gas seal at one end and means mounted on or fitted to the other end of the adaptor stem for receiving a hose fitting which connects one end of a hose to the adaptor and the opposite end of the hose to a pressurized gas bottle, such that auxiliary gas may be supplied to the tee fitting and the gas supply line when a gas meter is being repaired or replaced, to continually provide gas service to a residence or commercial property during maintenance of the gas meter.

Summary of the Invention

These and other objects of the invention are provided in a gas service tee characterized by a tee fitting mounted in the gas service line downstream from a gas meter and an adaptor having an elongated, hollow, perforated adaptor stem threaded in the tee fitting and having a gas seal at one end and means at the opposite end for threadably adjusting the adaptor stem and selectively sealing the gas service tee and gas supply line from metered gas flow. The adaptor further includes a hose connector accessory for engaging the adaptor stem and receiving a hose fitting to connect the adaptor stem to a bottled supply of gas, such that gas may be introduced through the adaptor stem into the gas supply line and to the property while the gas meter is being replaced or repaired.

BRIEF DESCRIPTION OF THE DRAWING

The invention will be better understood by reference to the accompanying drawing, wherein.

DESCRIPTION OF THE PREFERRED EMBODIMENTS

Figure 1:
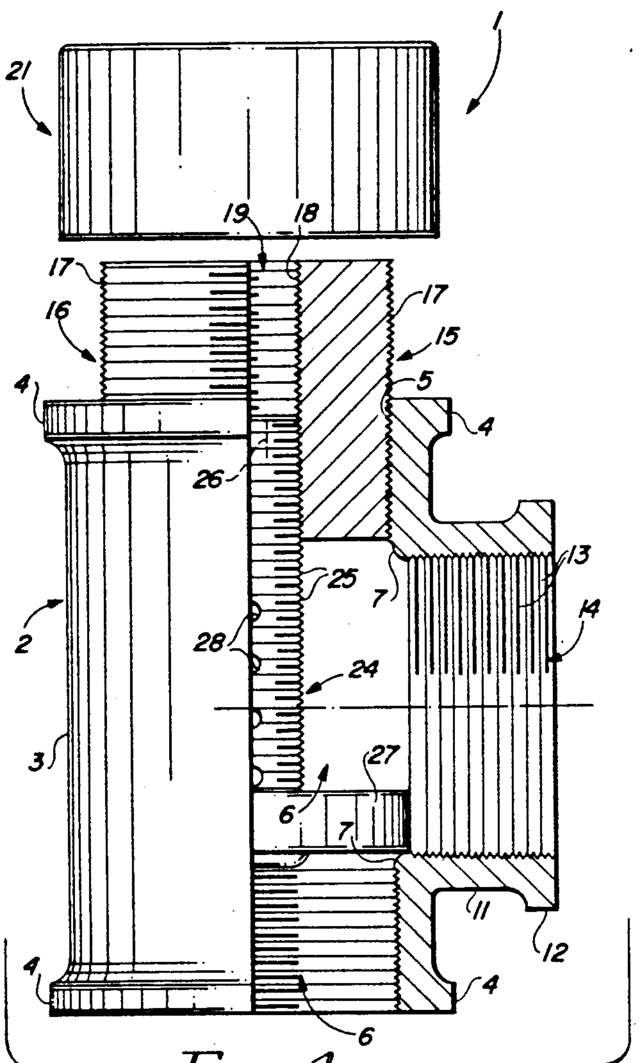
FIG. 1 is a quarter-sectional view of a first preferred embodiment of the gas service tee of this invention.
Figure 2:
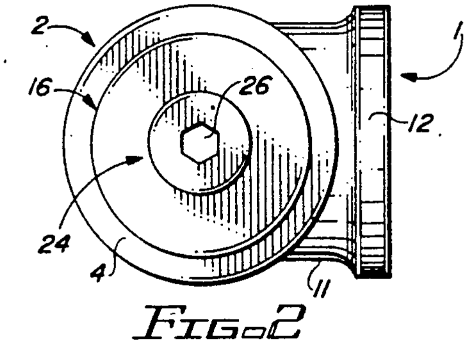
FIG. 2 is a top view of the gas service tee illustrated in FIG. 1, with the adaptor fitting cap removed.
Figure 3:
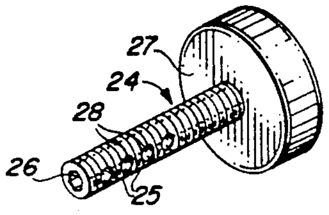
FIG. 3 is a perspective view of preferred adaptor stem and stem seal components of the tee fitting illustrated in FIGS. 1 and 2.

Referring initially to FIGS. 1-3 of the drawings, in a first preferred embodiment the gas service tee of this invention is generally illustrated by reference numeral 1. The gas service tee 1 is characterized by a tee fitting 2, having a tee run 3 terminated by a pair of oppositely-disposed run flanges 4 and fitted with internal run threads 5, communicating with a run bore 6, which extends between the run flanges 4. The run threads 5 each extend from the run flanges 4 to round run shoulders 7, respectively, located in the run bore 6, as further illustrated in FIG. 1. A tee leg 11 projects from the tee run 3 between the run flanges 4 and is terminated by a leg flange 12. A leg bore 14 extends inwardly of the leg flange 12 and communicates with the run bore 6 of the tee fitting 2 and leg threads 13 extend from the leg flange 12 inwardly to the run shoulders 7, as further illustrated in FIG. 1. An adaptor 15 is mounted in one end of the tee run 3 of the tee fitting 2 and includes an adaptor fitting 16, which is provided with external threads 17, for engaging the run threads 5 of the tee run 3. Internal threads 18 are also provided in an adaptor fitting bore 19, which extends longitudinally through the center of the adaptor fitting 16. An adaptor fitting cap 21 is provided with internal cap threads 22 (illustrated in FIG. 4), which engage the external threads 17 of the adaptor fitting 16 and seat against the run flange 4 which receives the adaptor fitting 16, as further illustrated in FIG. 1. An elongated adaptor stem 24 is provided with external stem threads 25, which engage the internal threads 18 of the adaptor fitting 16 to facilitate extension of one end of the adaptor stem 24 into the run bore 6, as further illustrated in FIG. 1. A resilient stem seal 27 is attached to the end of the adaptor stem 24 which projects into the run bore 6 and is designed to selectively seat against one of the run shoulders 7 of the tee leg 11 when the adaptor stem 24 is threadably advanced in the adaptor fitting bore 19, as illustrated in FIG. 1. The opposite end of the adaptor stem 24 is provided with a drive seat 26, which is illustrated in hexagonal configuration in FIG. 2, but which may be of any desired configuration, including any one of many selected tamper-proof configurations, according to the knowledge of those skilled in the art. Under circumstances where the drive seat 26 is a tamper-proof configuration, a correspondingly-shaped tamper-proof tool (not illustrated) may be used to engage and register with the drive seat 26 for rotating the adaptor stem 24 inside the adaptor fitting 16 and open and close the run bore 6 by operation of the stem seal 27, as hereinafter more particularly described. Accordingly, it will be appreciated from a consideration of FIGS. 1-3, that the adaptor fitting cap 21 can be unthreaded from the adaptor fitting 16 to provide access to the adaptor stem 24 and the drive seat 26 and open and close the tee fitting 2 to the passage of gas, as further hereinafter described.

Referring now to FIGURES 1 and 3 of the drawing, in a most preferred embodiment of the invention the adaptor stem 24 is fitted with spaced stem openings 28 and the adaptor stem 24 is hollow, such that the stem openings 28 communicate with the hollow bore provided in the adaptor stem 24. However, the stem openings 28 each extend only through one wall segment of the adaptor stem 24 to communicate with the hollow bore therein and not through the oppositely-disposed wall segment of the adaptor stem 24, for reasons which will be further hereinafter described.

Figure 4:
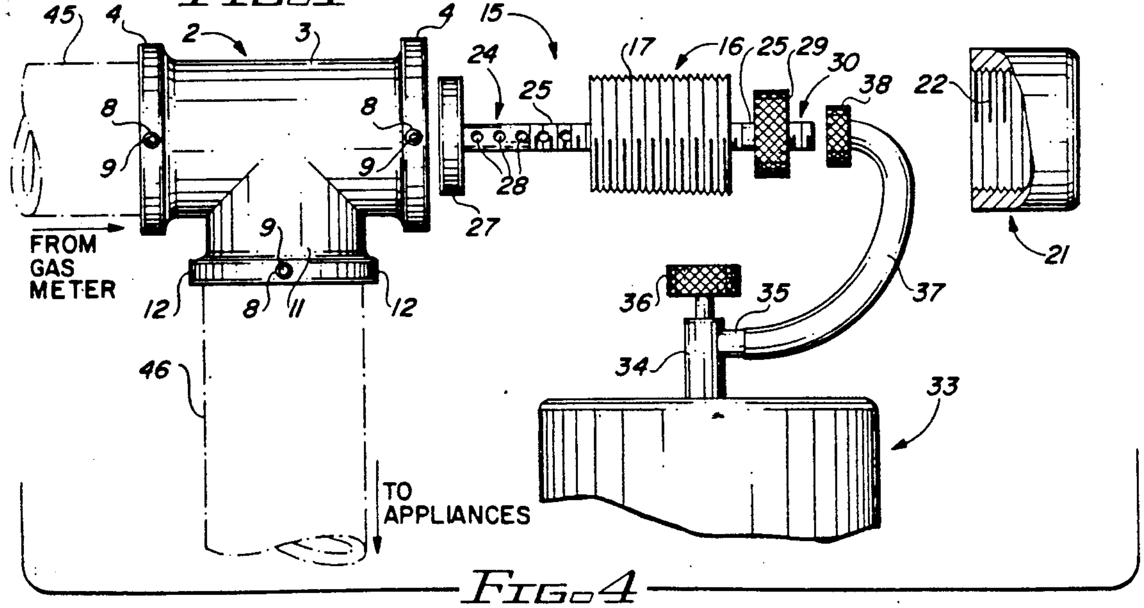
FIG. 4 is an exploded view of the gas service tee illustrated in FIGS. 1 and 2, more particularly illustrating an adaptor modified to receive a hose fitting for attaching the gas service tee to a pressurized gas bottle.

Referring now to FIGURES 1 and 4 of the drawing, in a second preferred embodiment of the invention the adaptor stem 24 is provided with a stem grip 29, located on the outwardly-extending end thereof and a guide nipple 30 projects from the stem grip 29, as illustrated in FIG. 4. The guide nipple 30 is fitted with external nipple threads 31, which are designed to threadably receive a hose fitting 38, which is connected to a fill hose 37, the opposite end of which fill hose 37 is attached to the fill bottle valve nipple 35 of a fill bottle valve 34. The fill bottle valve 34 projects from a fill bottle 33, containing a supply of auxiliary fuel gas under pressure. A fill bottle valve grip or handle 36 is attached to the fill bottle valve 34, to facilitate opening and closing the fill bottle valve 34. Accordingly, it will be appreciated that the hose fitting 38 can be threadably connected to the corresponding nipple threads 31 of the guide nipple 30 and the fill bottle valve grip 36 manipulated to open the fill bottle valve 34. This allows gas to flow from the fill bottle 33 through the hollow interior or bore of the adaptor stem 24 and from the corresponding stem openings 28 into the run bore 6 of the tee fitting 2, to temporarily maintain gas service to a customer, as further hereinafter described. As further illustrated in FIG. 4, the tee run 3 of the tee fitting 2 is mounted in a gas meter line 45 (illustrated in phantom in FIG. 4) which is located downstream from a gas meter (not illustrated) and the gas service tee 1 connects the gas meter line 45 to an appliance service line 46 (also illustrated in phantom), which mounts on the tee leg 11 and connects to the various appliances (not illustrated) located in a residential or service property. Furthermore, one or more allen screw seats 8, provided with allen screws 9, may be provided in the run flanges 4 and leg flange 12 of the tee fitting 2 to secure the adaptor fitting 16 in one end of the tee run 3, the opposite end of the tee run 3 on the gas meter line 45 and the tee leg 11 on the appliance service line 46.

Figure 5:
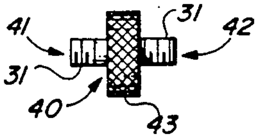
FIG. 5 is a side view of a hose connector for use with the adaptor component of the gas service tee illustrated in FIGS. 1-3.
Figure 6:
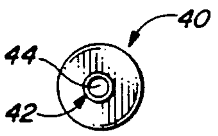
FIG. 6 is an end view of the hose connector illustrated in FIG. 5.

Referring now to FIGS. 5 and 6 of the drawings. in yet another preferred embodiment of the invention a tube connector 40 is provided. which tube connector 40 includes a connector grip 43, having an adaptor fitting nipple 41 projecting from one side thereof. The adaptor fitting nipple 41 includes external nipple threads 31 and a tube fitting nipple 42 projects from the opposite side of the connector grip 43 and is also provided with external nipple threads 31. A nipple bore 44 extends through the hose fitting nipple 42, connector grip 43 and adaptor fitting nipple 41. Accordingly, under circumstances where the adaptor 15 is configured as illustrated in FIGS. 1-3 of the drawing and the adaptor stem 24 is threadably seated in one end of the internal threads 18 of the adaptor fitting 16, the adaptor fitting nipple 41 can be threaded into the opposite end of the internal threads 18, to operate in the same manner as the stem grip 29 and the guide nipple 30 illustrated in FIG. 4. When the tube connector 40 is so connected, the tube fitting 38 can be threadably attached to the nipple threads 31 of the tube fitting nipple 42 and auxiliary gas supplied from the fill bottle 33 through the fill tube 37, by manipulation of the fill bottle grip 36.

In operation, and referring initially to FIGS. 1–3, 5 and 6 of the drawing, the gas service tee of this invention is operated to terminate gas service to a customer by initially unthreading the adaptor fitting cap 21 from the adaptor fitting 16 to expose the top end of the adaptor stem 24 and the drive seat 26. A tool which conforms to the configuration of the drive seat 26 is then inserted in the drive seat 26 and the adaptor stem 24 is rotated in the clockwise direction when the drive seat 26 is viewed as illustrated in FIG. 2. This action seats the stem seal 27 tightly against the run shoulder 7 as illustrated in FIG. 1 and prevents gas from flowing from the gas meter line 45 through the gas service tee 1, into the appliance service line 46. If the gas meter must be repaired or replaced, the hose connector 40 can be attached to the adaptor fitting 16 as described above and auxiliary gas may be introduced from a fill bottle 33 into the adaptor stem 24, tee fitting 2 and appliance service line 46, to prevent interruption of gas service to the customer.

As illustrated in FIG. 4, the same service can be supplied under circumstances where a stem grip 29 and guide nipple 30 are provided on the extending outside end of the adaptor stem 24. Arcordingly, the hose fitting 38 can be attached directly to the guide nipple 30 and auxiliary gas transferred from the fill bottle 33 into the gas service tee 1 and appliance service line 46 as described above.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A gas service tee for controlling gas flow through a gas service line, comprising a tee fitting mounted in the gas service line, an adaptor fitting seated in said tee fitting, an adaptor stem threadably seated in said adaptor fitting, a longitudinal adaptor stem bore provided in said adaptor stem and at least one opening provided in said adaptor stem, said opening communicating with said adaptor stem bore, seal means provided on one end of said adaptor stem for sealing said tee fitting and selectively opening and closing said tee fitting and the gas service line to the flow of gas and a drive seat provided in said adaptor stem for receiving a drive tool shaped to conform to said drive seat and manipulating said seal means into the open and closed configuration.

2. The gas service tee of claim 1 further comprising external adaptor fitting threads provided on said adaptor fitting and internal tee fitting threads provided in said tee fitting, wherein said adaptor fitting is threaded in said tee fitting.

3. The gas service tee of claim 1 further comprising cap means adapted for removable attachment to said adaptor fitting.

4. The gas service tee of claim 1 further comprising tube connector means adapted for removable attachment to said adaptor fitting, said tube connector means having a tube connector bore communicating with said adaptor stem bore when said tube connector means is attached to said adaptor fitting, whereby said tube connector means may be connected to a source of gas for selectively introducing the gas into said gas service tee and the gas service line through said adaptor stem.

5. The gas service tee of claim 4 wherein said tube connector means further comprises a connector grip, an adaptor fitting nipple attached to one side of said connector grip for removably engaging said adaptor fitting and a tube fitting nipple attached to the opposite side of said connector grip for engaging a hose connected to the source of gas.

6. The gas service tee of claim 4 wherein:

(a) said adaptor fitting is threaded in said tee fitting; and (b) said tube connector means further comprises a connector grip, an adaptor fitting nipple attached to one side of said connector grip for removably engaging said adaptor fitting and a tube fitting nipple attached to the opposite side of said connector grip for engaging a hose connected to the source of gas.

7. A gas service tee for controlling the flow of gas through a gas service line comprising a tee fitting mounted in the gas service line, an adaptor carried by said tee fitting, said adaptor further comprising an adaptor fitting seated in an open end of said tee fitting, an adaptor stem threadably seated in said adaptor fitting, a longitudinal adaptor stem bore provided in said adaptor stem and at least one opening provided in said adaptor stem, said opening communicating with said adaptor stem bore, a seal provided on one end of said adaptor stem and seat means provided in the opposite end of said adaptor stem for receiving a tool shaped to conform to said seat means, whereby said seal is selectively retracted and advanced inside said tee fitting to open and close said tee fitting and the gas service line to the flow of gas, responsive to engagement of said seat means with said drive tool and threadable manipulation of said adaptor stem in said adaptor fitting.

8. The gas service tee of claim 1 further comprising tube connector means adapted for removable attachment to said adaptor fitting, said tube connector means having a tube connector bore communicating with said adaptor stem bore when said tube connector means is attached to said adaptor fitting, whereby said tube connector means may be connected to a source of gas for selectively introducing the gas into said gas service tee and the gas service line through said adaptor stem.

9. A gas service tee for controlling the flow of gas through a gas service line comprising a tee fitting mounted in the gas service line, an adaptor carried by said tee fitting, said adaptor further comprising an adaptor fitting seated in an open end of said tee fitting, an adaptor stem threadably seated in said adaptor fitting, a longitudinal adaptor stem bore provided in said adaptor stem, at least one opening provided in said adaptor stem, said opening communication with said adaptor stem bore and a threaded nipple projecting from said stem grip for engaging a hose connected to a source of gas, a seal provided on one end of said adaptor stem, a stem grip provided on the opposite end of said adaptor stem for threadably manipulating said adaptor stem in said adaptor fitting, whereby said seal is selectively retracted and advanced inside said tee fitting to open and close said tee fitting and the gas service line to the flow of gas, responsive to threadable manipulation of said adaptor stem in said adaptor fitting by grasping said stem grip.

* * * * *